United States Patent [19]

Stearns

[11] Patent Number: 4,646,624
[45] Date of Patent: Mar. 3, 1987

[54] DIFFERENTIAL PRESSURE SENSOR

[75] Inventor: Charles F. Stearns, Longmeadow, Mass.

[73] Assignee: United Technologies Corporation, Hartford, Conn.

[21] Appl. No.: 638,339

[22] Filed: Aug. 6, 1984

[51] Int. Cl.⁴ ............................................. G01L 13/02
[52] U.S. Cl. .......................................... 92/37; 92/48; 73/716
[58] Field of Search ................. 73/716, 717, 718, 719, 73/720, 721, 722, 707; 92/37, 48, 97, 49; 137/82, 625.62

[56] References Cited

U.S. PATENT DOCUMENTS

| | | | |
|---|---|---|---|
| 2,712,321 | 7/1955 | Grogan | 92/49 |
| 2,747,614 | 5/1956 | Gray | 73/707 |
| 2,965,137 | 12/1960 | Leeson et al. | 92/37 |
| 3,074,435 | 1/1963 | Woestmeyer | 73/716 |
| 3,180,592 | 4/1965 | Jeye et al. | 137/82 |
| 3,348,417 | 12/1967 | Hitzelberger | 73/716 |
| 3,361,037 | 1/1968 | Likavec | 92/37 |
| 3,442,180 | 5/1969 | Babic | 92/37 |
| 3,698,412 | 10/1972 | Smyly | 92/49 |
| 3,766,834 | 10/1973 | Kraemer | 92/37 |
| 3,771,543 | 11/1973 | Wiggins | 137/625.62 |
| 3,874,405 | 4/1975 | Thayer | 137/625.62 |
| 4,131,130 | 12/1978 | Ruby . | |
| 4,449,548 | 5/1984 | Tutherly . | |

FOREIGN PATENT DOCUMENTS 2011124 7/1979 United Kingdom .................... 92/37

Primary Examiner—Robert E. Garrett
Assistant Examiner—Richard S. Meyer
Attorney, Agent, or Firm—John Swiatocha

[57] ABSTRACT

Sensed pressures are applied to a differential pressure sensor such that one-half the sensed pressure drop is applied to each of a pair of redundant pistons. Failure of one of a pair of bellows which seal opposite faces of the pistons from one another effects application of the entire pressure drop across the piston associated with the remaining, operable bellows for fail-safe operation of the sensor.

5 Claims, 2 Drawing Figures

DIFFERENTIAL PRESSURE SENSOR

The Government has rights in this invention pursuant to Contract No. F33657-82-C-2199 awarded by the Department of the Air Force.

TECHNICAL FIELD

This invention relates to differential pressure sensors for flow control systems such as those used in fuel controls for gas turbine engines.

BACKGROUND ART

It is well known that in fluid flow control systems volumetric fluid flow rate through a conduit depends on both the flow area of the conduit and the pressure drop thereacross. Accordingly, in establishing a desired volumetric flow rate in such a system, it is necessary to regulate not only the cross-sectional flow area of the conduit, but also the pressure drop therecross. In apparatus such as hydromechanical fuel controls for gas turbine engines, it is desirable to vary engine fuel flow in response to a single input to the fuel control, such input being, for example, movement of a linkage or the like by a corresponding movement of a pilot's power lever. Heretofore, it has been the practice to provide such hydromechanical fuel controls with a throttle (metering) valve and a pressure regulating (bypass) valve which maintains a constant known pressure drop of fuel across the metering valve so that a desired volumetric fuel flow can be established by the pilot's adjustment of the metering valve only. One known type of bypass valve maintains a constant pressure drop across the metering valve by controlling that portion of fuel flow bypassed away from the metering valve from a source of the fuel such as a pump output. One known type of bypass valve includes a spring biased valve element positionable by the pressure drop thereacross of a control fluid (fuel) applied thereto to control the amount of fuel flow bypassed away from the metering valve. This pressure drop across the bypass valve is itself controlled by a differential pressure sensor which detects the pressure drop across the metering valve and a pressure regulator which, in response to an output from the pressure sensor, adjusts the pressure drop across the bypass valve to maintain the desired pressure drop across the metering valve.

Accordingly, it will be appreciated that proper operation of the fuel control depends on the proper operation of the bypass valve, the differential pressure sensor and the regulator. Differential pressure sensors of the type discussed hereinabove frequently employ bellows which respond by linear movement thereof to the sensed pressure while the regulators often employ an orifice accommodating control fluid therethrough and a flapper or similar device to control the effective area of the orifice and thus, the pressure across the bypass valve. It will be readily appreciated that failure of the pressure sensor by a rupture or similar failure of the bellows, or failure of the pressure regulator by fouling of the flapper-orifice assembly by contamination therebetween, will result in a malfunction of the bypass valve and thus, failure of the metering valve to establish the desired flow. In a fuel control for a gas turbine engine powering an aircraft, such a malfunction could result in failure of the fuel control and thus the gas turbine engine itself.

A way of preventing such fuel control and engine failure would be the provision of redundancy in the pressure sensing bellows and pressure regulator flapper-nozzle assemblies. However, such redundancy per se is only achievable at the expense of increased complexity, cost and bulk of the system due to the attendant redundancy in various other collateral parts such as structural and fluid handling components employed with the pressure sensing bellows and pressure regulating orifices and flappers.

DISCLOSURE OF INVENTION

Accordingly, it is among the objects of the present invention to provide a fail-safe pressure sensor characterized by enhanced simplicity, compactness and economy.

In accordance with the present invention, a pressure drop measured by a differential pressure sensor is applied to corresponding faces of a pair of connected pistons, the opposite faces of which are sealed from one another in such a manner that in the event of a rupture of one of the bellows, the fluid pressure on that bellows is automatically applied to the operative bellows which under such conditions responds to the entire pressure drop thereacross, ensuring continued operation of the sensor despite the rupture. In the preferred embodiment, opposite faces of both pistons are sealed from each other by bellows connecting the pistons to the inner surfaces of a chamber which accommodates the fluid exhausted through the rupture in the damaged bellows for application of that fluid to the piston associated with the undamaged bellows. For simplicity, the pistons are connected together for joint movement thereof, the joint movement comprising a mechanical output of the sensor. Passages having identical restrictors therein provide shunts around portions of the chamber so that the entire pressure drop is not applied across each bellows thereby reducing the fluid pressure loading of the bellows to reduce the risk of failure thereof.

BEST MODE OF CARRYING OUT THE INVENTION AND INDUSTRIAL APPLICABILITY THEREOF

Figure 1:
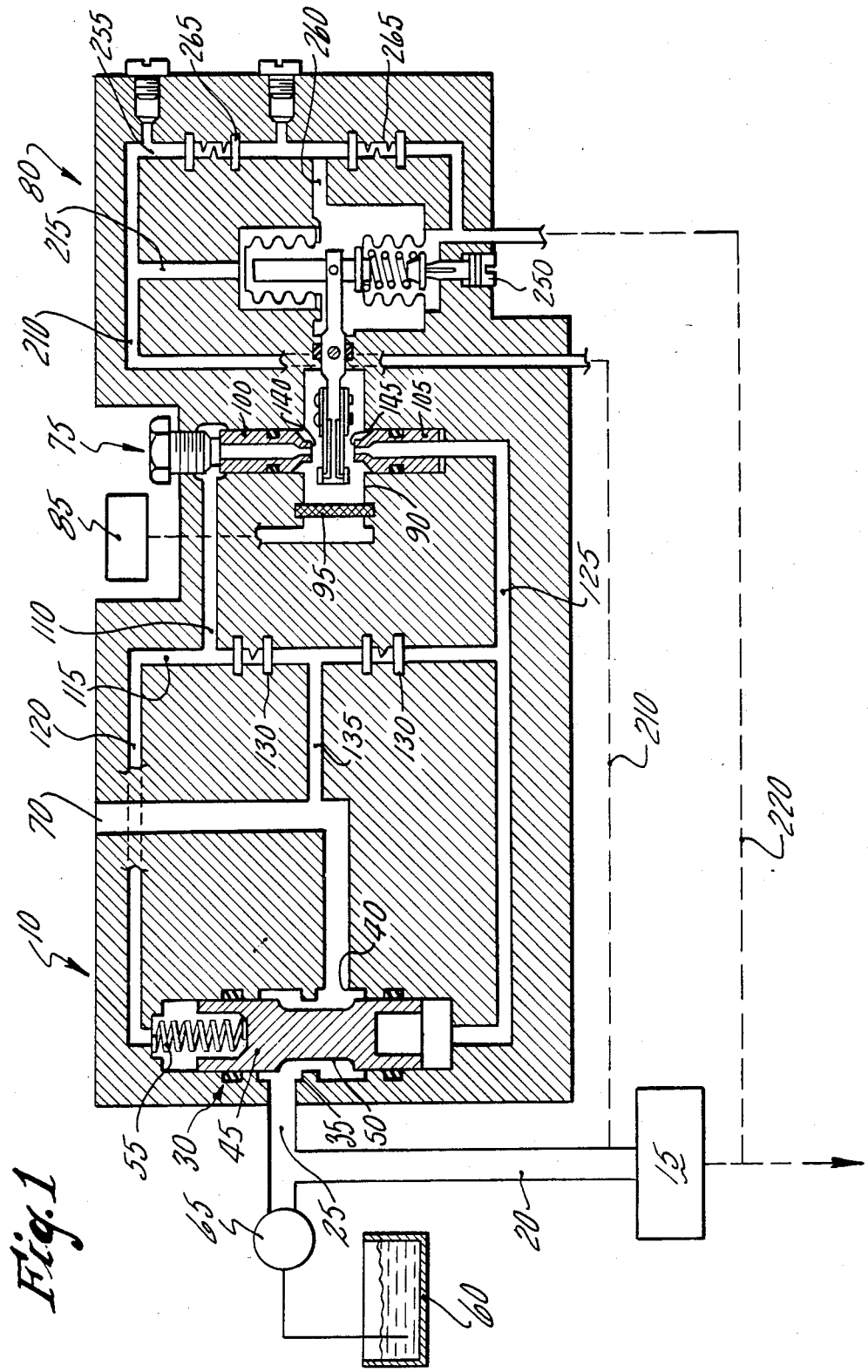
FIG. 1 is a schematic diagram of the apparatus of the present invention.
Figure 2:
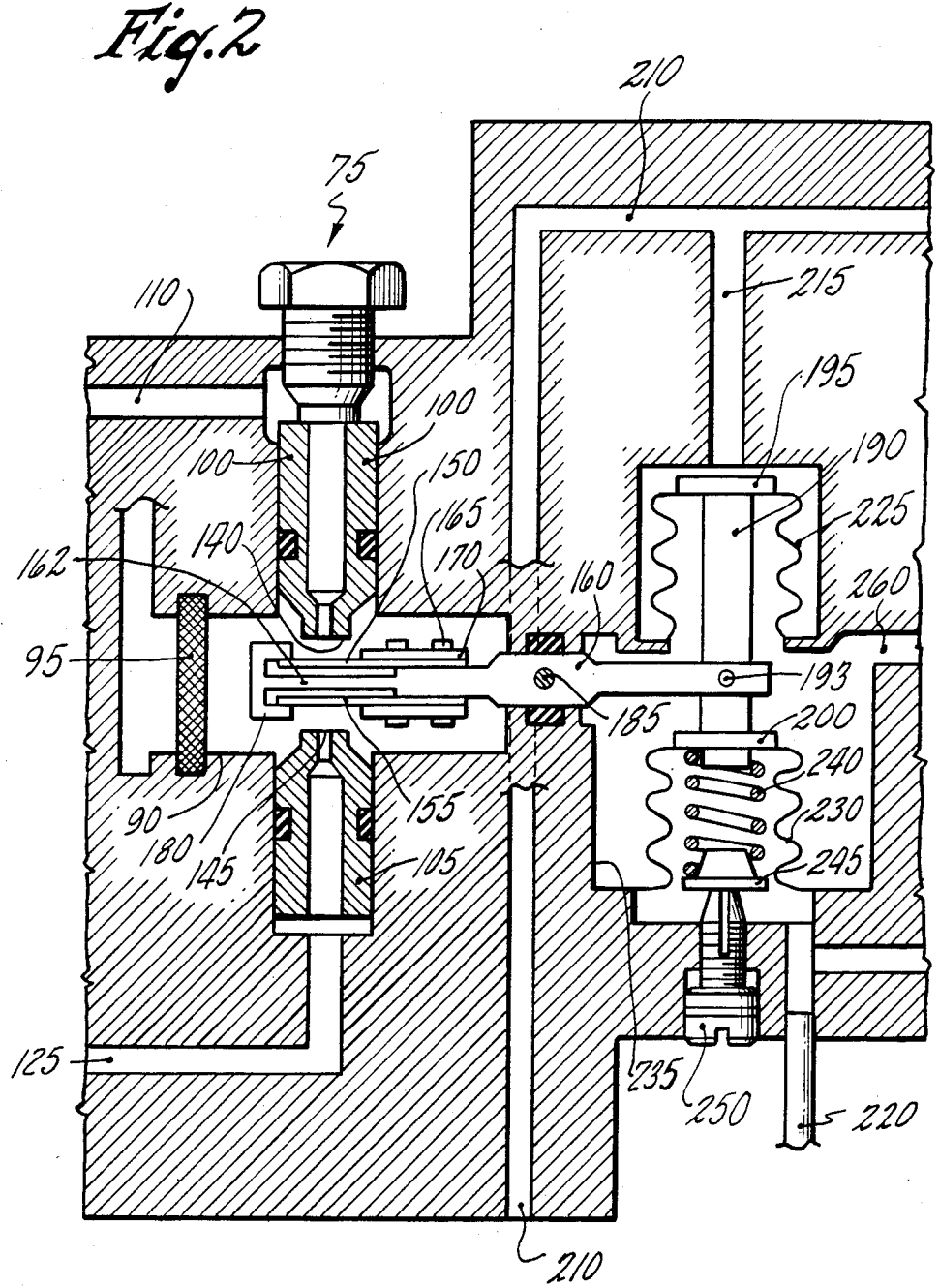
FIG. 2 is an enlargement of a portion of FIG. 1.

Referring to the drawing, a flow control system such as that employed in a modern fuel control for a gas turbine engine is shown at 10. System 10 comprises a metering valve 15 disposed in line 20 which, with line 25, connects the metering valve to a bypass (pressure regulating) valve 30 having an inlet 35 and an outlet 40 in the valve housing which accommodates a vertically reciprocal valve element 45 therewithin. As shown, valve element 45 includes a reduced diameter medial portion 50 biased downwardly by coil spring 55. Depending upon the vertical position of valve element 45, a portion of fuel flow from reservoir 60 delivered to line 25 by pump 65 bypasses line 20 (and hence metering valve 15 therein) through valve 30 (around medial portion 50 of valve element 45) and is exhausted, for example, back to reservoir 60, by return line 70.

Those skilled in the art will recognize that the system described hereinabove comprises a common scheme for delivering a known volumetric flow through metering valve 15 by a single adjustment of that valve, pressure regulating valve 30 holding the pressure across metering valve 15 constant by continuously bypassing metering valve 15 with a portion of the flow from pump 65.

Bypass valve 30 operates like many common fluid operated control devices, that is, the position of valve element 45 being determined by the pressure difference on the ends of the valve element and the restoring force afforded by spring 55. At equilibrium, the vector sum of the fluid pressure forces at the ends of the valve element is balanced by an equal and opposite restoring force from spring 55 and the valve element is held fixed. To adjust the position of the valve element and thus, adjust the bypass flow through valve 30 to compensate for excursions in the pressure drop across valve 15, the pressure at the ends of valve 30 is adjusted, causing an imbalance in the net pressure and spring force on valve element 45 and therefore, movement thereof. Readjustment of the pressure across the ends of valve element 45 to an equilibrium pressure drop, holds the valve element at the new position until further adjustment is required.

Fluid pressures at the ends of valve element 45 are adjusted and maintained by a pressure regulator 75 responsive to differential pressure sensor 80. Pressure regulator 75 is provided with pressurized control fluid from a source 85 thereof (such as, for example, the output of pump 65) through conduit 90 having filter 95 therein. As illustrated, pressure regulator 75 provides fluid communication between control fluid source 85 and bypass valve 30. The pressure regulator includes a pair of opposed nozzles 100 and 105, nozzle 100 communicating with the upper end of bypass valve 30 via lines 110, 115 and 120 and nozzle 105 communicating with the lower end of bypass valve 30 through line 125. Line 115 includes a pair of orifices 130 therein and communicates, between these orifices, with return line 70 via line 135 for purposes of providing a flow path from orifices 140 and 145 to line 70. Orifices 130 along with variations in the effective flow area of the nozzles control the pressure and flow to the ends of valve 130.

Nozzles 100 and 105 include at the free ends thereof, first and second orifices 140 and 145, the effective areas thereof being varied in response to the output of the pressure sensor 80 by flexible closures (flappers) 150 and 155. The flappers are disposed in mutually parallel orientation between the orifices and mounted on a lever 160 by any suitable means such as screws or rivets 165. Lever 160 includes a portion 162 of reduced thickness. The lever and flapper assembly is provided with a stiffening means in the form of plates 170 connected to the flappers of the outer surfaces thereon by rivets 165. It will be seen that the overhang of the flappers and plates with respect to reduced thickness portion 162 causes the plates to unidirectionally (outwardly) stiffen flappers 150 and 155, without any impediment to the inward movement of the flappers. The stiffening means also comprises stops 180 formed integrally in the free end of the lever adjacent the ends of the flappers for further limiting outward movement of the flappers. Arm 160 is pivotally mounted at 185 moving thereabout in response to the output of pressure sensor 80.

In operation, control fluid from source 85 is channeled by conduit 90 past the flappers to a location beween orifices 140 and 145 and then through nozzles 100 and 105. From the nozzles the control fluid flows through lines 110, 115 and 120 and line 125 to the ends of the bypass valve 30. As set forth hereinabove, to control the position of bypass valve element 45 and therefore the pressure drop across metering valve 15, the control fluid pressure at the ends of the bypass valve element must be controlled. Such control is achieved by movement of lever 160 by pressure sensor 80 and a resultant adjustment in position of flappers 150 and 155. Such adjustment of flapper position adjusts the flow through the orifices, raising the control fluid pressure at one end of the bypass valve and lowering the control fluid pressure at the opposite end to adjust the bypass valve setting.

It will be seen that pressure regulator 75 provides fail-safe control of bypass valve 30 in a compact, uncomplicated and economical manner wherein redundancy of component parts is minimized. Since a pair of control nozzles and flappers are employed, failure of either nozzle or flapper such as by contaminants lodged therebetween, still leaves a functioning nozzle or flapper for either raising or lowering the control fluid pressure at an appropriate end of the bypass valve to achieve proper operation thereof. Compactness is enhanced by the face-to-face disposition of the nozzle orifices with the flappers therebetween. In the prior art, such an arrangement would not have been possible since flow through the nozzles and subsequently past the flappers (the accepted practice) would tend to seat the flappers against the lever, thereby prohibiting effective control of flow through the nozzles. Plates 170 stiffen the flappers in the direction of closure against the mouths of the nozzles and stops 180 positively limited the travel of the flappers toward the nozzles. The disposition of the flappers on opposite ends of a single lever minimizes the number of collateral components required for such redundant pressure regulation. The unidirectional stiffening afforded by plates 170 and stops 180, as well as the flexibility of the flappers assure that fouling of a single nozzle-flapper combination by contaminants therebetween will not prohibit pivotal movement of the lever both toward and away from the fouled nozzle as the unfouled flapper moves with respect to its associated nozzle for pressure regulation of the bypass valve element.

With respect to differential pressure sensor 80, lever 160 moves about pivotal mount 185 therefor by reciprocal movement of rod 190 to which the lever is pivotally connected at 193. Rod 190 connects first and second pistons 195 and 200 respectively. Each piston includes an outer first face and an inner (closest to connection 193) second face, the first and second faces of each piston being opposite (defined by normals extending in opposite directions) one another. Lines 210 and 215 provide fluid communication between the first surface of piston 195 and fluid pressure immediately upstream of metering valve 15. Line 220 provides fluid communication between the first surface of piston 200 and fluid pressure immediately downstream of metering valve 15. The first and second faces of each of the pistons are sealed from one another by bellows 225 and 230 which extend from the pistons to the walls of a chamber 235 which houses the pistons and bellows and provides generally unrestricted fluid communication between the second (inner) surfaces of the pistons. The connected pistons are biased by a spring 240 received within bellows 230 between rod 190 and a seat 245. Seat 245 is mounted at the end of a threaded plug which, by rotation thereof, adjusts the position of the seat and therefore the compression of spring 245. As illustrated, limited fluid communication between the inner and outer surface of the pistons is provided by first and second shunt conduits 255 and 260 in conjunction with lines 215 and 220. Shunt conduit 255 includes a pair of generally identical flow restrictors 265 therewithin, conduit 260 connecting with conduit 255 between the flow restrictors. Conduits 255 and 260 with flow restrictors 265, divide the pressure drop across metering valve 15 between first and second pistons 195 and 200 so that essentially half the pressure drop is applied across each piston, thereby reducing the stress in the bellows employed therewith for enhanced bellowss life expectancy.

In operation, lines 210, 215 and 220 apply the pressure drop across metering valve 15 which is to be maintained constant, to the first faces of pistons 195 and 200. When the resultant pressure force across the pistons is balanced by the restoring force from spring 240, the pistons remain in stationary equilibrium. An excursion of the pressure drop across metering valve 15 results in a variation in the fluid pressure force acting on the pistons from the equilibrium value and the resultant force on the pistons from the vector sum of this pressure force and the restoring force from spring 240 moves the pistons jointly, thereby pivoting lever 160 about point 185 to adjust the flow of control fluid through the nozzles. This in turn adjusts the pressure drop across bypass valve 30 thereby adjusting the pressure drop across metering valve 15 to the desired value.

Presure sensor 80 described herein provides redundant pressure sensing and control of the regulator in an uncomplicated, compact and economical manner. The pressure regulator and sensor are connected by single rod 190 and both pistons and bellows are housed within a single chamber 235 for enhanced simplicity. Chamber 235, in providing generally unrestricted fluid communication between the second (inner) surfaces of the pistons, accommodates leakage though a rupture of either bellows and applies such leakage to the inner face of the piston associated with the redundant, operating bellows. In other words, under conditions of normal operation, the sensed pressure drop is applied across the pair of pistons 195 and 200 but, in the event of a failure of one of the bellows (the components of the sensor most susceptible to premature failure) the entire pressure drop is automatically applied to the piston associated with the functioning bellows for fail-safe operation of the sensor. While as set forth hereinabove shunt conduits 255 and 260 with restrictors 265 reduce the presure drop across each bellows to approximately half the pressure drop across the metering valve for minimizing the required size and strength of the bellows, it is contemplated that bellows of such construction would, for a limited time until repairs are made, be able to accommodate the entire pressure drop across the metering valve. In the event that reduction in bellows size and strength is not of paramount importance, shunt lines 255 and 260 as well as restrictors 265 may be dispensed with and chamber 235 sealed and evacuated.

While the present invention has been described within the environment of a fuel control for a gas turbine engine, it will be understood that the invention per se is not so limited and is useful in any fluid pressure control system similar to that described herein. While a particular embodiment of the present invention has been described, it will be understood that this description will suggest, to those skilled in the art, various modifications to the present invention such as the dispensation of the shunt conduits and restrictors discussed immediately hereinabove. Accordingly, it is intended by the following claims to cover this and any other alterations or modifications as fall within the true spirit and scope of this invention.

Having thus described the invention what is claimed is:

1. A differential pressure sensor which detects a difference between two fluid pressures and provides an output signal indicative thereof, said differential pressure sensor being characterized by:
   first and second pistons, each including generally opposed first and second faces;
   means connecting said first and second pistons for joint movement thereof, said joint movement comprising said output signal;
   means sealing the first face of each piston from the second face thereof;
   first means providing fluid communication between one of said pressures and said first surface of said first piston;
   second means providing fluid communication between the other of said pressures and said first surface of said second piston;
   third means providing generally unrestricted fluid communication between said second surfaces of said pistons while accommodating leakage through a rupture of said sealing means associated with either of said pistons and applying said leakage to said second surface of the other of said pistons for fail-safe operation of said differential pressure sensor by said other piston; and
   fourth means providing communication between said third means and said first and second means for applying a pressure which is intermediate said two fluid pressures to both said second piston surfaces, thereby dividing said pressure difference between said first and second pistons under normal operating conditions.

2. The differential pressure sensor of claim 1 characterized by said sealing means comprising bellows.

3. The differential pressure sensor of claim 1 characterized by said third means comprising a chamber, said sealing means sealing the edges of said pistons to the interior of said chamber.

4. The differential pressure sensor of claim 3 characterized by said sealing means comprising bellows.

5. The differential pressure sensor of claim 1 characterized by said fourth means further comprising a shunt conduit providing limited fluid communication between said first piston surfaces and the interior of said third means, said shunt conduit having a pair of generally identical flow restrictors therewithin whereby under normal operating conditions, generally half of said pressure difference is applied across each of said pistons.

* * * * *